US008326269B1

(12) United States Patent
Tong et al.

(10) Patent No.: US 8,326,269 B1
(45) Date of Patent: Dec. 4, 2012

(54) WIRELESS UNLOCKING SYSTEM

(75) Inventors: Song-Lin Tong, Shenzhen (CN); Hai-Qing Zhou, Shenzhen (CN); Yi-Xin Tu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 13/224,347

(22) Filed: Sep. 2, 2011

(30) Foreign Application Priority Data

Jun. 24, 2011 (CN) .......................... 2011 1 0173056

(51) Int. Cl.
*H04M 1/66* (2006.01)

(52) U.S. Cl. ........ 455/411; 455/410; 455/418; 455/420; 455/550.1

(58) Field of Classification Search .................. 455/410, 455/411, 418, 420, 415, 550.1; 726/2, 4, 726/5, 15, 16, 17, 21
See application file for complete search history.

(56) References Cited

U.S. PATENT DOCUMENTS

2004/0057567 A1* 3/2004 Lee .......................... 379/167.01
2009/0215394 A1* 8/2009 Dewan .......................... 455/41.2
2011/0090043 A1* 4/2011 Tseng .......................... 340/5.7

* cited by examiner

*Primary Examiner* — Kathy Wang-Hurst
(74) *Attorney, Agent, or Firm* — Altis Law Group, Inc.

(57) ABSTRACT

A wireless unlocking system includes a programmable telephone. When the programmable telephone receives a call from a communication terminal along with a calling telephone number, the calling telephone number is matched with a number of pre-stored telephone numbers. The programmable telephone transmits an unlocking signal to an electrically controlled lock and unlocks a door if the telephone number of the call successfully matches one of the pre-stored telephone numbers.

9 Claims, 2 Drawing Sheets

WIRELESS UNLOCKING SYSTEM

BACKGROUND

1. Technical Field

The present disclosure relates to unlocking systems, and particularly, to a wireless unlocking system.

2. Description of Related Art

Unlocking elements, such as mechanical keys or magnetic cards, may be used to lock or unlock a door of a house. If the unlocking elements are forgotten or lost, then a person the house cannot get inside the house through the door. The user needs to wait for someone else to open the door.

Therefore, it is desirable for a system and method, which can overcome the limitations described.

DETAILED DESCRIPTION

Embodiments of the disclosure will now be described in detail, with reference to the accompanying drawings.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
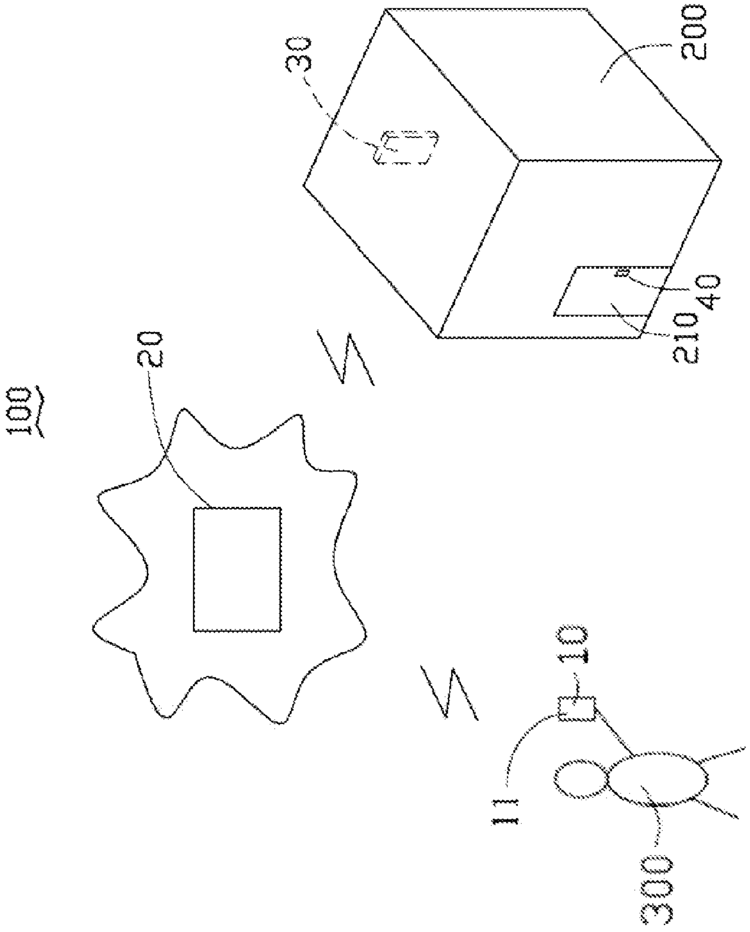
FIG. 1 is a schematic, exploded view of a wireless unlocking system in accordance with an exemplary embodiment.
Figure 2:
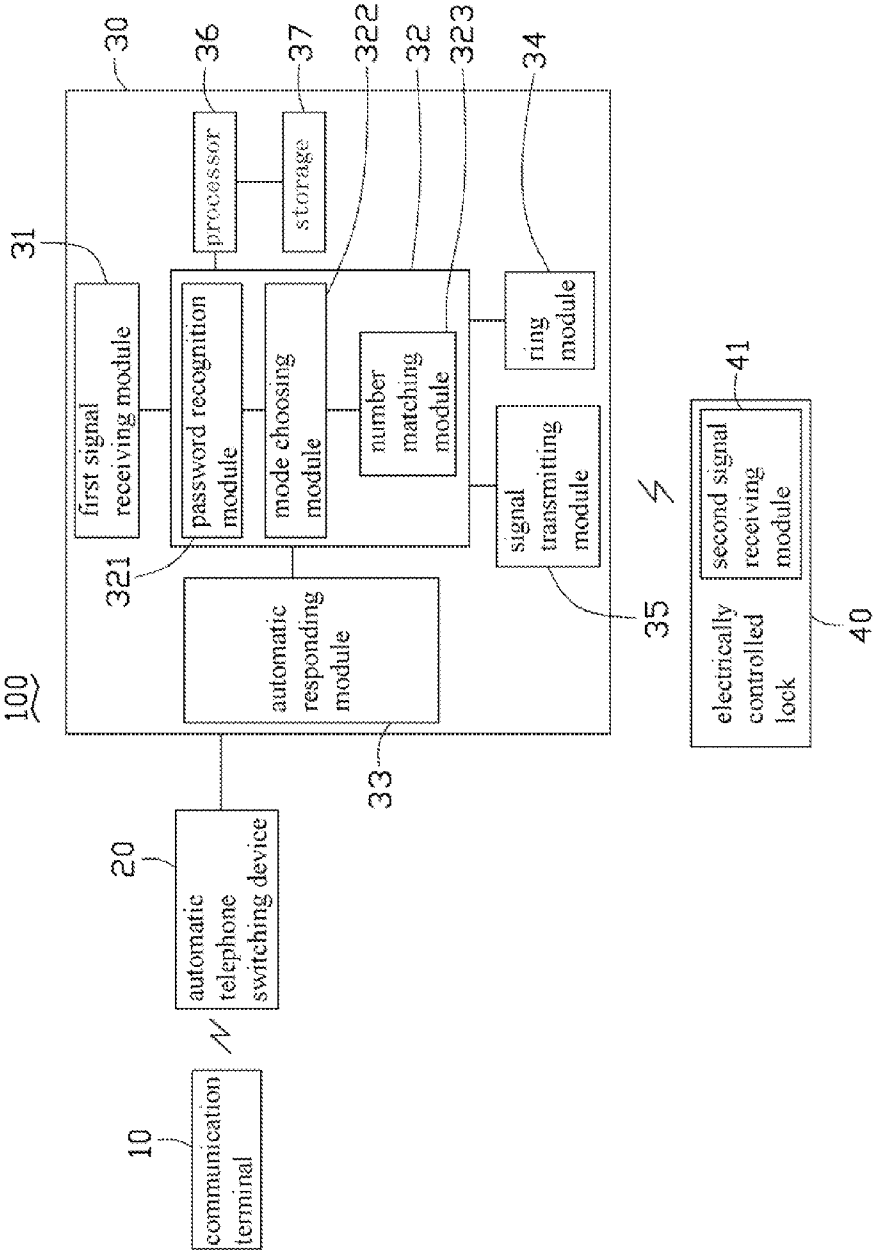
FIG. 2 is a block view of the functions of the wireless unlocking system in accordance with an exemplary embodiment.

Referring to FIGS. 1-2, a wireless unlocking system 100, according to an exemplary embodiment, includes a communication terminal 10, a telephone exchange system 20, a programmable telephone 30, and an electrically controlled lock 40.

The communication terminal 10 can be a mobile phone or a land line telephone, and used by a user 300. The communication terminal 10 is configured with at least one telephone number, and the telephone number can be changed as needed. In one embodiment, the communication terminal 10 is a dual-SIM card mobile phone configured with a communicating telephone number and an unlocking telephone number. The communicating telephone number is a telephone number to be used for person-to-person communications, and the unlocking telephone number is a telephone number to be used only to unlock a door 210 of a house 200. The communication terminal 10 can be a GSM or 3G phone.

The telephone exchange system 20 is provided by a network operator, such as ATT, VERIZON, and SPRINT, and may be used for transmit data from the communication terminal 10 to the programmable telephone 30. In one embodiment, the telephone exchange system 20 is wirelessly connected to the communication terminal 10 and is hardwired to the programmable telephone 30. The telephone exchange system 20 is a system of electronic components for connecting telephones. A central office houses inside plant equipment including telephone switches, which make telephone calls "work" in the sense of making connections and relaying spoken or other information.

The programmable telephone 30 is positioned inside the house 200, and includes a first signal receiving module 31, a control module 32, an automatic sound module 33 a ring module 34, and a signal transmitting module 35, a processor 36, and a storage system (e.g., flash memory) 37. The first signal receiving module 31, the automatic sound module 33, the ring module 34, and the signal transmitting module 35 are connected to the control module 32. One or more software codes of the modules 31-35 are stored in the storage system 37 and executed by the processor 36.

The first signal receiving module 31 is connected to the telephone exchange system 20, and receives calls from the communication terminal 10 along with a calling telephone number. In one embodiment, the first signal receiving module 31 is hardwired.

The control module 32 includes a password recognition module 321, a mode choosing module 322, and a number matching module 323. The password recognition module 321 pre-stores a built-in password. When a call is received by the first signal receiving module 31, the automatic sound module 33 outputs a first sound signal to the communication terminal 10, and requires the user 300 of the communication terminal 10 to input a verifiable password. The user 300 inputs the verifiable password via a keyboard 11 of the communication terminal 10. The password recognition module 321 compares the verifiable password with the built-in password and determines whether or not the verifiable password supplied is the same as the built-in password. The security and privacy of the programmable telephone 30 can be improved by setting the built-in password, in order that strangers can not call the programmable telephone 30 by chance.

The mode choosing module 322 includes a communication mode and an unlocking mode. The communication mode is a security mode of the telephone 30 is used for person-to-person communication with the communication terminal 10, and the unlocking mode is a security mode of the telephone 30 to be used for unlocking the door. The automatic sound module 33 outputs a second sound signal to the communication terminal 10, and requires the user 300 to select between the communication mode and the unlocking mode after the verifiable password matches with the built-in password successfully. The user 300 selects the communication mode or the unlocking mode via the keyboard 11 of the communication terminal 10. For example, "1" represents the communication mode and "2" represents the unlocking mode. If the user 300 selects the communication mode, the ring module 34 is started and generates a ringing to indicate an incoming call in response to user-selection of the communication mode. If the user 300 selects the unlocking mode, the number matching module 323 automatically acquires the calling telephone number of the communication terminal 10 which is making the call.

The number matching module 323 pre-stores a number of telephone numbers. When the number matching module 323 acquires the calling telephone number, the number matching module 323 matches the calling telephone number with the pre-stored telephone numbers. When the calling telephone number successfully matches one of the pre-stored telephone numbers, the automatic sound module 33 feedbacks that the calling telephone number is effective to the communication terminal 10 (e.g., by displaying a prompt on a display screen of the communication terminal 10, or sounding a ring). When the calling telephone number does not match with one of the pre-stored telephone numbers, the automatic sound module 33 feedbacks that the calling telephone number is ineffective to the communication terminal 10. In this embodiment, the telephone numbers pre-stored in the number matching module 323 belong to the family and/or other selected associates of the user 300.

The signal transmitting module 35 transmits an unlocking signal to the electrically controlled lock 40 after the calling telephone number has been successfully matched with the pre-stored telephone numbers. In this embodiment, the signal transmitting module 35 is wirelessly connected to the electrically controlled lock 40. The waveform of the unlocking signal can be adjusted according to different but successfully matched telephone numbers.

The electrically controlled lock 40 includes a second signal receiving module 41 and a magnetic controlling switch (not shown) connected to the second signal receiving module 41. When the second signal receiving module 41 receives the unlocking signal from the signal transmitting module 35, the magnetic controlling switch is activated and the door is thus unlocked.

In using, the user 300 without his/her mechanical key(s) or magnetic card(s) can call the programmable telephone 30 using the unlocking telephone number of the communication terminal 10. The first signal receiving module 31 receives the call from the user 300 along with a calling telephone number. The automatic sound module 36 requires the user 300 to input a verifiable password. The password recognition module 321 compares the verifiable password supplied with the built-in password and determines whether or not the verifiable passwords match. If the verifiable password supplied is the same as the built-in password, the automatic sound module 33 requires the user 300 to select between the communication mode and the unlocking mode. If the user 300 selects the unlocking mode, the number matching module 34 acquires the calling telephone number and attempts to match the calling telephone number with the pre-stored telephone numbers. If the calling telephone number does match with one of the pre-stored telephone numbers, the automatic sound module 33 feedbacks that the calling telephone number is effective to the communication terminal 10. The signal transmitting module 35 transmits the unlocking signal to the second signal receiving module 41, and the magnetic controlling switch of the electrically controlled lock 40 is activated. Therefore, the door of the house is opened.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A wireless unlocking system, comprising:

a processor;

a storage system storing one or more modules that are executed by the processor, the one or more modules comprising:

a first signal receiving module configured for receiving a call from a wireless communication terminal along with a calling telephone number;

an automatic sound module configured for requiring a user of the wireless communication terminal to select between a communication mode and an unlocking mode of the wireless unlocking system via a keyboard of the wireless communication terminal;

a number matching module that pre-stores a plurality of telephone numbers; the number matching module determining if the calling telephone number matches one of the pre-stored telephone numbers in response to user-selection of the unlocking mode; and a signal transmitting module for transmitting an unlocking signal to an electrically controlled lock of a door, the unlocking signal enabled to unlock the door in response to the calling telephone number matching one of the pre-stored telephone numbers.

2. The wireless unlocking system of claim 1, wherein the one or more modules further comprises a ring module configured for ringing to indicate an incoming call in response to user-selection of the communication mode.

3. The wireless unlocking system of claim 1, wherein the one or more modules further comprises a password recognition module configured for pre-storing a built-in password and comparing the built-in password with a verifiable password input by the user.

4. The wireless unlocking system of claim 3, wherein when the first signal receiving module receives the call from the user, the automatic sound module requires the user to input the verifiable password via the keyboard.

5. The wireless unlocking system of claim 4, wherein if the verifiable password is the same as the built-in password, the automatic sound module requires the user to select between the communication mode and the unlocking mode via the keyboard.

6. The wireless unlocking system of claim 4, wherein when the calling telephone number matches with one of the pre-stored telephone numbers, the automatic sound module feedbacks the calling telephone number is effective; when the calling telephone number does not match with one of the pre-stored telephone numbers, the automatic sound module feedbacks that the calling telephone number is ineffective.

7. The wireless unlocking system of claim 1, wherein the wireless communication terminal is a dual-SIM card mobile phone configured with a communicating telephone number and an unlocking telephone number.

8. The wireless unlocking system of claim 7, wherein a telephone exchange system is wirelessly connected to the wireless communication terminal and is hardwired to the wireless unlocking system.

9. The wireless unlocking system of claim 7, wherein the communicating telephone number is a telephone number to be used for person-to-person communications, and the unlocking telephone number is a telephone number to be used only to unlock the door.

* * * * *